Oct. 8, 1935.       M. S. TYSON       2,016,526
ROLLER BEARING
Filed May 22, 1934
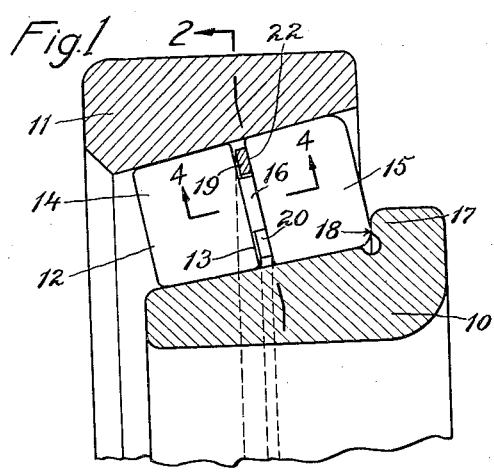
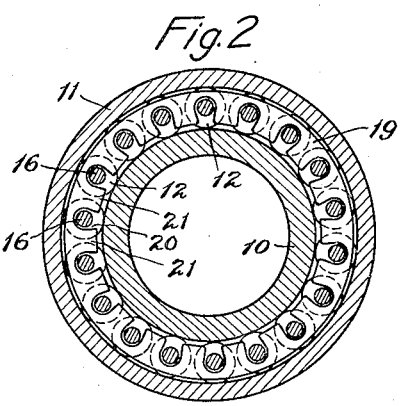
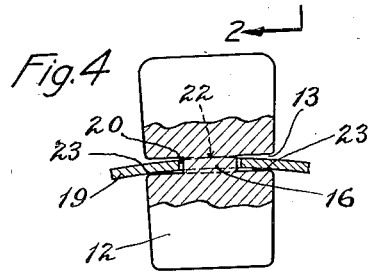
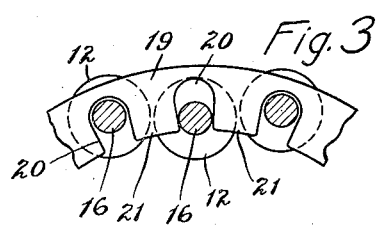
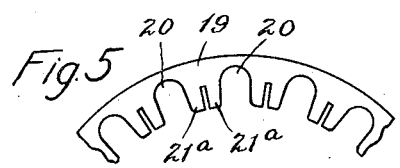
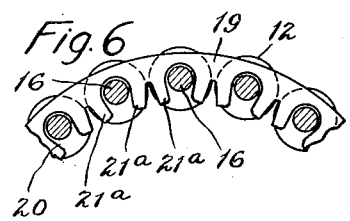
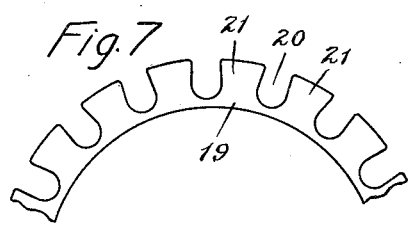
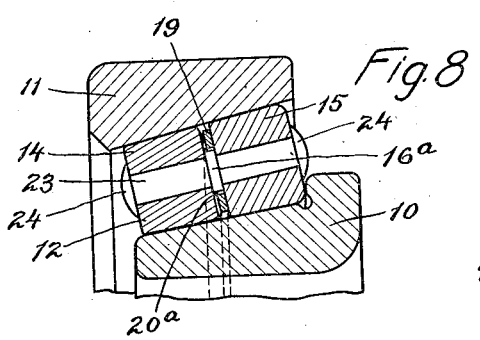
Inventor,
M. S. Tyson,
By Robert M. Pierson,
Attorney Patented Oct. 8, 1935

2,016,526

UNITED STATES PATENT OFFICE 2,016,526

ROLLER BEARING

Miller S. Tyson, Canton, Ohio

Application May 22, 1934, Serial No. 726,877

5 Claims. (Cl. 308—218)

This invention relates to roller bearings and parts thereof. Its principal objects are to provide an assembly of rollers and spacer member adapted to be handled as a self-contained unit wherein adjacent rollers are held out of contact with each other, to simplify and reduce the cost of such a unit, to facilitate the assembling of the rollers with the spacer member and their removal therefrom in some forms of the invention, to provide a spacer member which will allow the use of substantially the largest complement of rollers which can be placed in a given pitch circle without touching or will allow the use of a smaller number, and to provide an assembly including a simple roller-spacing and retaining ring coacting with the rollers to maintain their axes in the proper positions, especially in a tapered bearing.

Of the accompanying drawing, Fig. 1 is an enlarged axial section through one side of a tapered roller bearing constructed in accordance with one embodiment of my invention.

Fig. 2 is a cross section of the complete bearing on a smaller scale, taken approximately on the line 2—2 of Fig. 1.

Fig. 3 is a fragmental section corresponding to Fig. 2 and showing the mode of removal of one of the rollers.

Fig. 4 is an enlarged axial section through one of the rollers and the spacer ring, taken approximately on the line 4—4 of Fig. 1, with the curvature of the ring somewhat exaggerated.

Fig. 5 is a front elevation of a segment of a modified spacer ring before bending parts thereof to retain the necks of the rollers in the notches of said ring.

Fig. 6 is a corresponding view of the assembly, ring and rollers after said parts are bent to retain the roller necks.

Fig. 7 is a front elevation showing a segment of a modified snap spacer ring having notches opening radially outward.

Fig. 8 is a view corresponding to Fig. 1 showing a further modification.

Referring at first to Figs. 1 to 4, 10 is the inner race-way member or cone of a tapered, metal roller bearing, 11 is the outer race-way member or cup, and 12 are tapered rollers interposed between the male and female conical bearing surfaces of the cone and cup respectively. Each of said rollers is circumferentially grooved at 13, about midway of its length, to divide the roller into end portions 14 and 15 of smaller and larger average diameter respectively, whose groove faces are flat and parallel in radial planes, and leave a central reduced neck or short shaft portion 16 at the bottom of the groove, integral with the end portions.

The bearing cone 10 is shown as formed at its large end with an integral flange 17 for retaining the rollers against working off said large end, the acting face of said flange bearing against the rounded corner edge of each roller, where it merges into the flat, radial end face of the roller, at a single point of tangency 18, thereby reducing wear at the bearing points of said rollers against the flange, and tending to avoid cocking or angular misplacement of the axes of the rollers.

19 is a roller spacing member or ring in the form of a frustum of a hollow cone, with opposite, parallel male and female surfaces, occupying the grooves 13 of the rollers, and formed with a series of uniformly-spaced, U-shaped, radial notches 20, opening in this case at the inner edge of the ring, for receiving the roller necks 16. The latter fit the sides of the notches with minimum clearance, so that the peripheries of adjacent rollers will be held apart to avoid frictional contact of roller with roller, while allowing the use of substantially the largest complement of rollers which can be accommodated in the pitch circle of the group. The number of notches is preferably a multiple of three, eighteen being shown in this instance. If any smaller number of rollers is desired for lighter loads and higher speeds, the same spacer ring can be used, and some of the rollers omitted, leaving the remainder, with three as a minimum, disposed in a symmetrical arrangement.

A notched blank for the ring 19 may be stamped out of flat sheet metal, then pressed to conical form, and preferably heated and hardened while being held against distortion.

The solid, inter-notch portions 21 of the spacer ring 19 are preferably of such width between the mouths of the notches 20 that the width of each notch mouth is smaller, by a few thousandths of an inch, than the diameter of the roller neck 16. The solid metal of the ring, over the outer ends of the notches, is comparatively narrow, so that the ring can be locally sprung in the plane thereof to permit an individual roller neck to be forced or snapped into and out of its notch, and when in place to be retained in the assembly by means of the inter-notch portions 21. The middle one of the rollers in Fig. 3 is shown substantially at the mouth of its notch to illustrate this action and relation of parts.

This combination of members, wherein the notched ring 19 acts in the dual capacity of a spacer and retainer for the group of rollers 12, permits the assemblage of rollers and ring to be handled as a unit when out of the bearing, without danger of disconnecting individual rollers, and avoids the necessity of using a roller retainer on the small end of the cone, as in many prior tapered roller bearings. Advantage is thereby gained in practical applications of the bearings, for example on automobile wheels, where it may be desired in a car assembly line to place the cone part of the bearing on the axle at a place in the line considerably in advance of that at which the wheel, carrying the cup part of the bearing, is applied to the axle. The roller assembly is covered with lubricating grease, and if held by a retainer on the cone so that the two have to be located as a sub-unit on the axle, it may pick up grit which would injure the bearing, before the wheel can be applied; whereas my unit assembly of rollers and retainer ring can be separately supplied, ready greased and in a wrapper, and then applied, after removal of the wrapper, just before the wheel goes on, without danger of contamination.

It will be noted by reference to Figs. 1 and 4 that the ring 19, although noticeably thinner than the width of the groove 13 in each roller, by reason of the conical shape of said ring, fits the groove faces with substantially zero clearance, or only enough for free running. On the convex or male side of the coned ring, there is contact at 22 on a substantially radial line, and on the concave or female side there is contact at two points 23 at opposite ends of a groove-face diameter of the roller tangent to the pitch circle of the roller group. The conical curvature of the ring and relative width of the roller groove are somewhat exaggerated in Fig. 4 to bring out this interaction.

Through the described structure and relation of parts, the axes of the rollers are held without substantial cocking or skewing, in their proper working positions, and the rollers held apart, by a simple retainer ring performing the essential functions of the more complicated and expensive cages heretofore employed, which ordinarily prevent the employment of a full complement of rollers; while the necessity for using a retainer at the small end of the bearing to hold the roller group assembled on removal of the outer raceway is avoided.

In Figs. 5 and 6 is illustrated a modified construction of the spacer ring 19 wherein the inter-notch portions of said ring are each divided by a radial cut into a pair of prongs 21a which are laterally bendable in the plane of the ring, as by means of a suitable multiple wedging tool, either before or after said ring is assembled with the rollers 12, so that said prongs will restrict each of the notch mouths to a width smaller than the diameter of the roller neck 16. If the spreading of the prongs is performed before assembling the ring with the rollers, the width of the notch mouths will be left only slightly smaller than the diameters of the roller necks, so that the neck of the individual roller can be snapped into and out of its notch by a local springing of the ring, to which the narrow prongs 21a contribute. Where the rollers are assembled with the ring before the prongs are bent, the bending of one or both prongs defining the side or sides of a notch may be carried so far that the neck of each roller will be permanently held in its notch, and not removable except with the aid of a tool for bending the prong or prongs back toward their original position shown in Fig. 5.

Fig. 7 illustrates a further modification wherein the spacer ring 19 is formed with roller-neck receiving radial notches 20 which open at the outer instead of the inner edge of the ring. In this illustration, the inter-notch portions 21 are shown solid or single as in Figs. 2 and 3, but they might obviously be divided into laterally-bendable prongs as shown in Figs. 5 and 6.

In the further modification illustrated in Fig. 8, a tapered roller bearing is provided with inner and outer raceway members 10, 11 of the form illustrated in Fig. 1, and the unit assembly of grooved tapered rollers 12 and conical spacer ring 19 is of the same generic character as in the first-described embodiment, but the ring is formed with circular holes 20a instead of notches for the reception of the necks of the rollers, each roller is permanently retained on the ring by making its end portions 14 and 15 as separate members and connecting them by a central pin 23 having a circular enlargement 16a constituting the roller neck, which may either be an integral flange or a washer on the pin, and retaining the pin upon the roller members by riveting over its ends 24, to either rigidly connect the roller parts or allow its end portions 14, 15 to turn on the pin.

Various other changes of embodiment could be made without departing from the scope of my invention as defined in the claims.

I claim:

1. An assembly of tapered rollers and spacer ring for use in a tapered roller bearing comprising a series of rollers, each formed with a circumferential groove surrounding a reduced neck portion, and a conical roller-spacing and aligning ring formed with parallel side faces having a close running fit in said groove, and with radial notches whose edges straddle the roller necks, and laterally contacting with the groove faces of the rollers on opposite sides of the roller axes to avoid substantial skewing of the rollers.

2. An assembly according to claim 1 in which the roller grooves are in a radial plane and parallel sided and their faces have respectively a radial line contact with the convex side of the conical spacer ring and a pair of point contacts with the concave side on opposite sides of each roller axis.

3. An assembly according to claim 1 in which each roller is in one piece and the mouths of the ring notches are narrower than the roller necks for retaining the rollers on the ring when the assembly is out of the bearing.

4. A roller and spacer assembly for tapered roller bearings comprising an annular series of tapered roller formed with grooves and reduced necks, and a conical metal plate spacer ring having inner and outer peripheries within the diameter of the rollers, on opposite sides of their axes, occupying said grooves and formed with radial notches removably receiving the roller necks and of smaller mouth width than said necks to retain the rollers and permit the handling of said assembly as a unit, said notches being equally spaced and of a number permitting the use of the largest number of rollers which will go in the roller circle without mutual contact, or of a smaller number in symmetrical arrangement.

5. A roller and spacer assembly according to claim 4 in which the mouth sides of the notches are spreadable by the passage of the roller necks and springing of the ring to permit snapping of the rollers into and out of their places on the ring.

MILLER S. TYSON.